United States Patent
Lim et al.

(10) Patent No.: US 10,208,505 B2
(45) Date of Patent: Feb. 19, 2019

(54) SMART SECURITY DEVICE AND SYSTEM

(71) Applicant: Ascent Solutions Pte Ltd, Singapore (SG)

(72) Inventors: Chee Kean Lim, Singapore (SG); Kia Boon Chew, Singapore (SG); Fuxiang Dai, Singapore (SG)

(73) Assignee: Ascent Solutions Pte Ltd, Singapore (SG)

( * ) Notice: Subject to any disclaimer, the term of this patent is extended or adjusted under 35 U.S.C. 154(b) by 0 days.

(21) Appl. No.: 15/507,163

(22) PCT Filed: May 13, 2016

(86) PCT No.: PCT/SG2016/050225
§ 371 (c)(1),
(2) Date: Feb. 27, 2017

(87) PCT Pub. No.: WO2017/082816
PCT Pub. Date: May 18, 2017

(65) Prior Publication Data
US 2017/0284128 A1 Oct. 5, 2017

Related U.S. Application Data

(63) Continuation-in-part of application No. PCT/SG2015/050439, filed on Nov. 9, 2015.

(51) Int. Cl.
*H04W 12/08* (2009.01)
*E05B 39/00* (2006.01)
(Continued)

(52) U.S. Cl.
CPC .......... *E05B 39/005* (2013.01); *E05B 45/005* (2013.01); *E05B 67/003* (2013.01); *G01S 19/13* (2013.01); *G06K 7/10297* (2013.01); *G06K 19/07758* (2013.01); *G06Q 10/08* (2013.01); *G06Q 10/0833* (2013.01); *G06Q 50/28* (2013.01); *H04W 4/80* (2018.02)

(58) Field of Classification Search
None
See application file for complete search history.

(56) References Cited

U.S. PATENT DOCUMENTS

| 5,786,759 A | * | 7/1998 | Ling | B62J 3/00 340/542 |
| 8,122,744 B2 | * | 2/2012 | Conti | E05B 45/005 242/382 |

(Continued)

FOREIGN PATENT DOCUMENTS

| EP | 2189964 A1 | 5/2010 |
| GB | 2508896 A | 6/2014 |

OTHER PUBLICATIONS

Foreign Communication From a Related Counterpart Application, International Search Report and Written Opinion dated Aug. 7, 2016, International Application No. PCT/SG2016/050225 filed on May 13, 2016.

(Continued)

*Primary Examiner* — K. Wong (57) ABSTRACT

A smart security device comprising: a housing, electronics in the housing, the electronics comprising a tag configured to be uniquely associated with the smart security device and automatically and periodically emitting a Bluetooth signal; a cable having a free end and a secured end secured to the housing in electrical connection with the electronics; and a lock assembly in the housing, the lock assembly comprising a body comprising a cable passage for passing the free end of the cable therethrough and for immobilizing the cable therein, a lever having a free end and a pivoting end pivotably connected to the body and having a resilient plate configured to exert a force on a cable immobilizer against the cable when the lever is brought into contact with the body while the cable is in the cable passage, and a fastener to secure the lever to the body.

16 Claims, 8 Drawing Sheets

(51) Int. Cl.

| | |
|---|---|
| *E05B 67/00* | (2006.01) |
| *G06Q 10/08* | (2012.01) |
| *E05B 45/00* | (2006.01) |
| *G06Q 50/28* | (2012.01) |
| *H04W 4/80* | (2018.01) |
| *G01S 19/13* | (2010.01) |
| *G06K 7/10* | (2006.01) |
| *G06K 19/077* | (2006.01) |

(56) References Cited

U.S. PATENT DOCUMENTS

| | | | |
|---|---|---|---|
| 8,640,509 B2 * | 2/2014 | Will | E05B 45/005 |
| | | | 70/14 |
| 8,854,207 B2 * | 10/2014 | Williams | E05B 73/0011 |
| | | | 340/539.13 |
| 9,062,476 B2 * | 6/2015 | Kao | E05B 73/00 |
| 9,169,670 B2 * | 10/2015 | Shute | E05B 45/005 |
| 2014/0091931 A1 | 4/2014 | Cava et al. | |
| 2014/0109631 A1 | 4/2014 | Asquith et al. | |
| 2015/0020558 A1 | 1/2015 | Williams | |
| 2015/0154839 A1 | 6/2015 | Stoddard | |
| 2016/0321884 A1 * | 11/2016 | Bremer | E05B 73/0017 |

OTHER PUBLICATIONS

Lim, Chee Kean, et al., entitled "Location Tracking System", International Application No. PCT/SG2015/050439, filed on Nov. 9, 2015.

\* cited by examiner

SMART SECURITY DEVICE AND SYSTEM

CROSS-REFERENCE TO RELATED APPLICATIONS

The present application is a filing under 35 U.S.C. 371 as the National Stage of International Application No. PCT/SG2016/050225, filed May 13, 2016, entitled "SMART SECURITY DEVICE AND SYSTEM," which is a Continuation in Part of International Application No. PCT/SG2015/050439 filed on Nov. 9, 2015, both of which are incorporated herein by reference in their entirety for all purposes.

FIELD OF THE INVENTION

This invention relates to a smart security device and system, and in particular to a smart security device and system for securing as well as tracking the location and status of items such as cargo and assets.

BACKGROUND OF THE INVENTION

In today's global market, goods are conveyed internationally and their safe delivery and storage is important to the many parties involved. In particular, it is important to guard against theft and misdirection, or at least to provide a deterrent to unauthorized or illegal activity involving the goods. Besides the conveyance of goods, it is also often desired to secure items of value even during storage. Devices exist that are intended to serve the above functions. However, many are either prohibitively costly, or easily tampered with. There is thus a need to provide a secure and cost effective security device and security system that can be operated easily and requiring minimal reconfiguration or retrofitting of additional components to the conveyance vehicles in order to keep items secure and to track the location and status of items along the entire chain of custody including during storage of the items.

SUMMARY OF INVENTION

According to a first aspect, there is provided a smart security device for attaching to an item to be secured, the smart security device comprising: a housing, electronics provided in the housing, the electronics comprising a tag configured to be uniquely associated with the smart security device, the tag further configured to automatically and periodically emit a first signal, the first signal being a Bluetooth signal configured to be sent and received via a Bluetooth low energy wireless personal area network; a cable having a free end and a secured end, the secured end being secured to the housing and in electrical connection with the electronics; and a lock assembly at least partially provided in the housing, the lock assembly comprising a body comprising a cable passage configured for passing the free end of the cable therethrough and for immobilizing the cable therein, a lever having a free end and a pivoting end, the pivoting end pivotably connected to the body, the lever having a resilient plate provided thereon, the resilient plate configured to exert a force on a cable immobilizer against the cable to immobilize the cable in the cable passage when a side of the lever facing the body is brought into contact with a side of the body facing the lever while the cable is in the cable passage, and a fastener configured to secure the lever to the body when the cable is immobilized in the cable passage.

The cable immobilizer may comprise a pin and the body further comprise a pin passage configured for holding the cable immobilizer therein, the pin passage opening into the cable passage, wherein upon exerting a force on a first end of the cable immobilizer, a second end of the cable immobilizer extends out of the pin passage into the cable passage when the cable is not in the cable passage.

The resilient plate may be configured to be elastically deformed against the cable immobilizer when the cable is in the cable passage and the lever is secured to the body, the cable immobilizer being longer than the pin passage.

The smart security device may further comprise a biasing element provided within the pin passage to bias the cable immobilizer away from the cable passage.

The fastener may comprise a lock passage provided in the body and a lock pin provided on the lever, the lock passage configured to receive the lock pin therein.

The lever and the lock pin may be provided with a hole passing through the lever and the lock pin, the hole configured for passing a cable tie therethrough to secure the lock pin to the lever and prevent withdrawal of the lock pin from the lock passage without cutting of the cable tie.

The body may be at a side of the housing and partially encased by the housing.

According to a second aspect, there is provided a smart security system comprising: the smart security device of any preceding claim; a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal; a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network; and an application configured to be installed in the receiving transmitter, the application configured to allow the receiving transmitter to automatically receive the first signal and to initiate transmission of the second signal from the receiving transmitter to the data system.

The first signal may comprise information associated with the smart security device, and the second signal may comprise information associated with the receiving transmitter and at least part of the information associated with the smart security device.

The information associated with the receiving transmitter may include ownership and location information of the receiving transmitter, and the information associated with the smart security device may include information identifying the item to which the smart security device is attached and status of the smart security device.

Status of the smart security device may comprise at least one of: whether the smart security device is electronically locked and whether the smart security device is physically secured.

The smart security system may comprise a plurality of the receiving transmitter at various locations, wherein the second signal transmitted from each of the plurality of the receiving transmitter provides a record of movement of the item to which the smart security device is attached and a record of status of the smart security device, the movement being from an authorized sender to an authorized recipient through the various locations.

The second signal from one of the plurality of the receiving transmitter that is located at a location of the authorized recipient may include an electronic proof of delivery when the authorized recipient receives the item.

The application may be configured to initiate transmission of the second signal from the receiving transmitter to the data system via at least one of: automatic transmission and user-activated transmission.

The application may be configured to allow a user to select one of: automatic transmission and user-activated transmission to initiate transmission of the second signal from the receiving transmitter to the data system.

The smart security system may comprise a plurality of the smart security device, the receiving transmitter being provided at a location where a number of items are stored, each of the number of items having one of the plurality of the smart security device attached thereto that is registered with the data system to indicate that the number of items are expected to be at the location, wherein the application installed in the receiving transmitter is configured to match received signals from each of the smart security devices at the location with expected presence of the registered smart security devices and to transmit an alert to the data system if a signal expected to be received from any one of the registered smart security devices is not received by the receiving transmitter within a specified time frame.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of the smart security device 10 and smart security system 1000 will be described below with reference to FIGS. 1 to 10 in which the same reference numerals are used to denote the same or similar parts.

Figure 1:
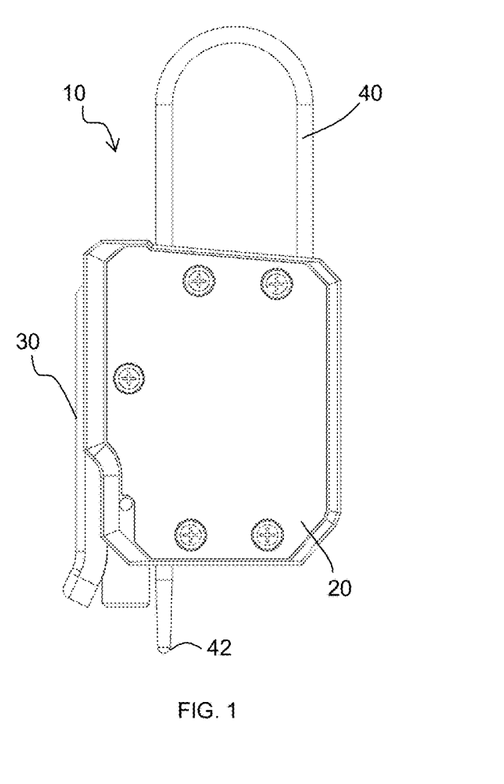
FIG. 1 is a front view of an exemplary smart security device.

As shown in FIG. 1, the smart security device 10 comprises a housing 20 having a lock assembly 30 and containing electronics (not shown) configured to send a signal to a receiver when the electronics is activated by attaching the smart security device 10 to an item to be secured. The item may be anything that needs to be continually monitored, whether this is during movement of the item or during storage or display of the item. The item includes any mode of conveyance for transporting cargo to be monitored. For example, the smart security device 10 is particularly suited for securely monitoring transit goods conveyed by road, sea and rail, including both containerized and non-containerized cargo, fuel trucks, bulk liquid tankers and motor vehicle units. The smart security device 10 is also applicable for goods to be transported to bonded warehouses, export goods, e-commerce packages, cash in transit, goods in transit (for example from port to container freight station and inland container terminal), transhipment goods, goods imported or exported under various governmental programs and so on.

Figure 3:
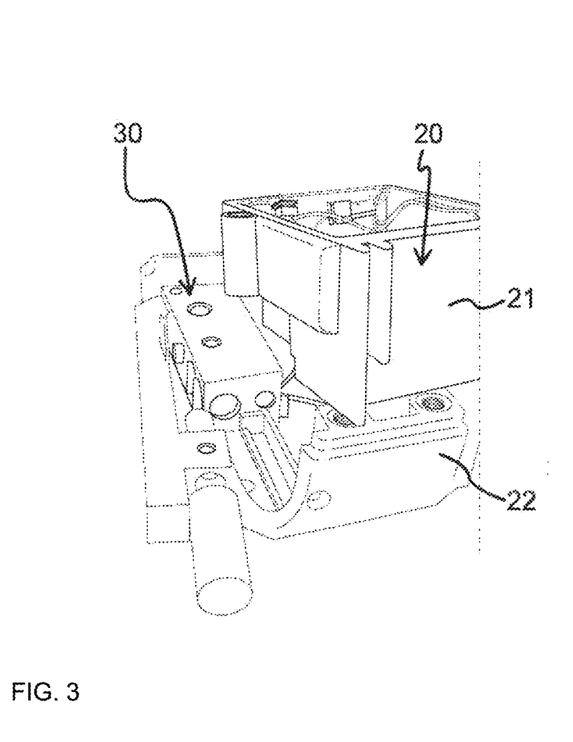
FIG. 3 is a perspective view of a prototype smart security device of FIG. 1 with an open housing to show a prototype lock assembly.

The housing 20 preferably comprises a front portion 21 and a back portion 22, as shown in FIG. 3. The housing 20 is preferably made of a plastics or other suitable light weight material while the lock assembly 30 is preferably made of metal. The lock assembly 30 is configured to be in electrical connection with the electronics in the housing 20 when the lock assembly 30 is activated.

The smart security device 10 also comprises a cable 40 having a secured end 41 and a free end 42. The secured end 41 of the cable is configured to be in electrical connection with the electronics, while the free end 42 is configured to be passed around a part of the item to attach the security device 10 to the item, for example, the locking bars of a container. The free end 42 of the cable 40 is further configured to be passed through the lock assembly 30 to secure and activate the smart security device 10, as will be described in greater detail below.

Figure 2:
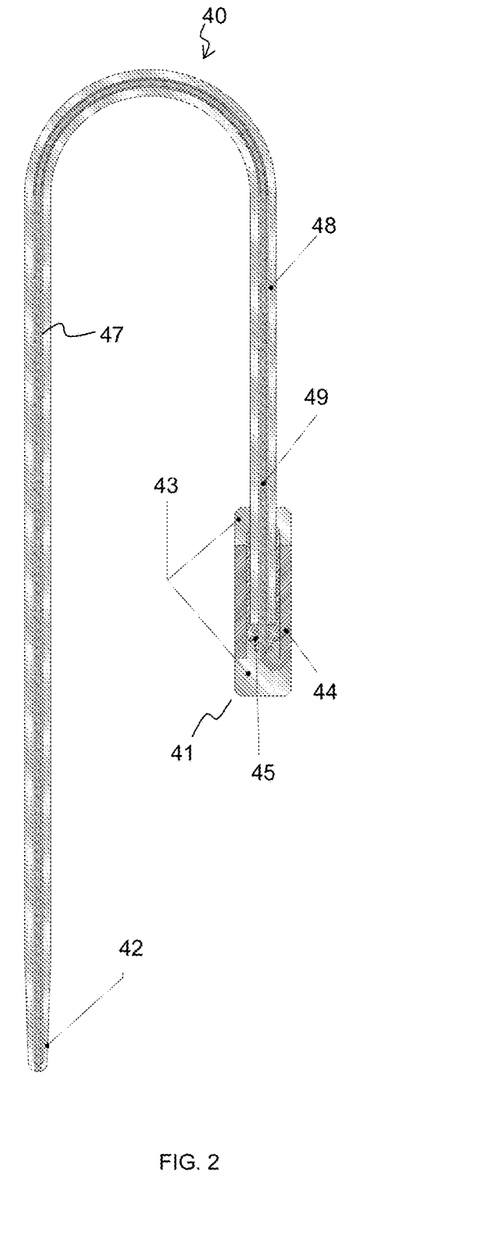
FIG. 2 is a schematic illustration of an exemplary cable of the smart security device of FIG. 1.

The cable 40 as shown in FIG. 2 preferably comprises an inner conducting core 49, a layer of insulation 47 disposed around the inner conducting core 49, and an external conductive layer 48 disposed outside and around the layer of insulation 47 along the length of the cable 40. The inner conducting core 49 and the layer of insulation 47 may be provided together as a shielded conducting cable. The external conductive layer 48 is preferably of stainless steel and may be provided as a stainless steel cable, but may be any other suitable material able to effect electrical connection and withstand wetting without significant corrosion. The external conductive layer 48 is configured to be in electrical connection with the inner conducting core 49 only at the free end 42 of the cable 40. This may be achieved by welding the inner conducting core 49 to the external conductive layer 48 at the free end 42.

The secured end 41 is provided with a conducting surround 44 such as a copper sleeve 44 that is in electrical connection with the inner conducting core 49. The conducting surround 44 is insulated from the external conductive layer 48 via an insulation tubing 45. The conducting surround 44 may further be provided with insulating plastic end caps 43. The secured end 41 is configured to be secured within the housing 20 so that the conducting surround 44 is in constant electrical connection with the electronics of the smart security device 10.

Figure 4A:
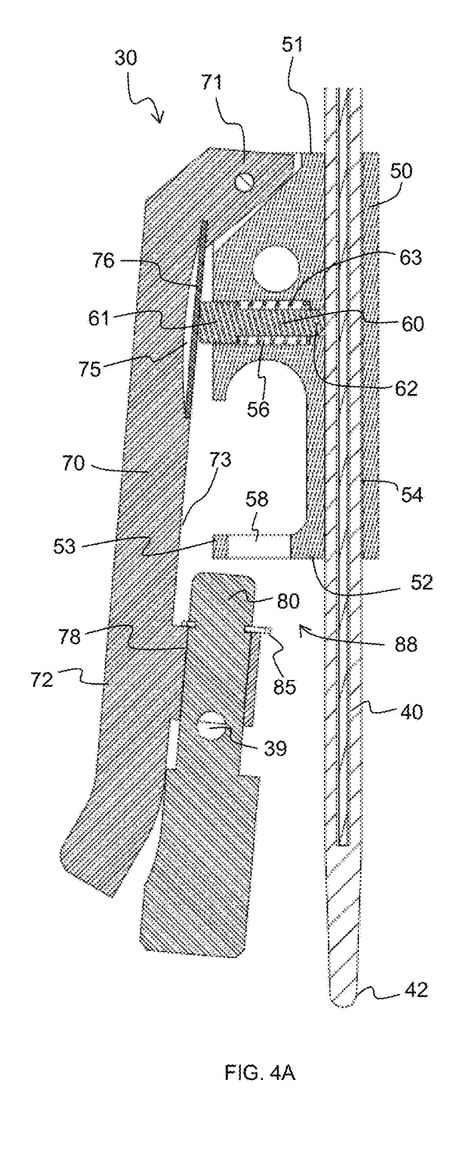
FIG. 4A is a front section view of the lock assembly of FIG. 1 in an unlocked position.
Figure 4B:
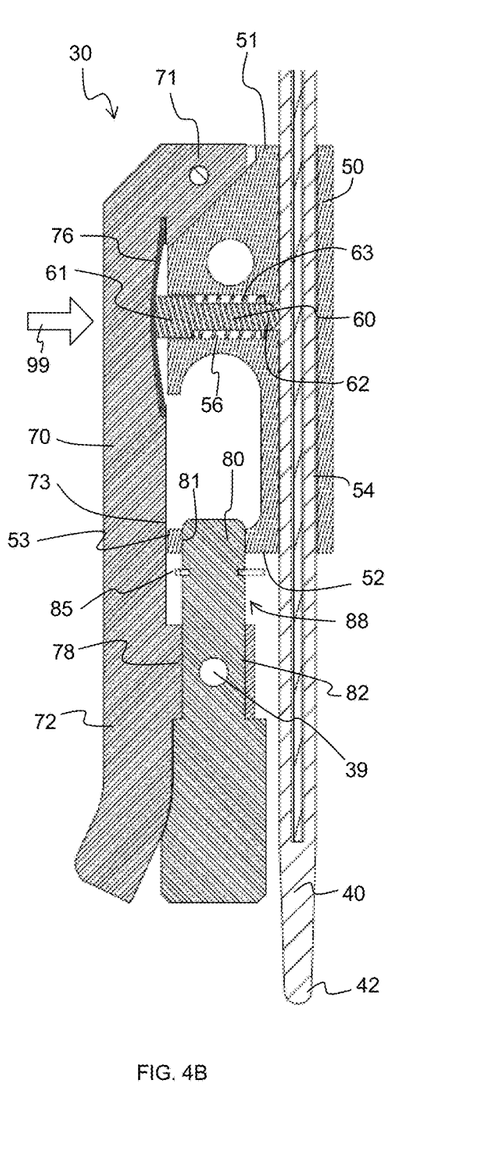
FIG. 4B is a front section view of the lock assembly of FIG. 1 in a locked position.
Figure 5:
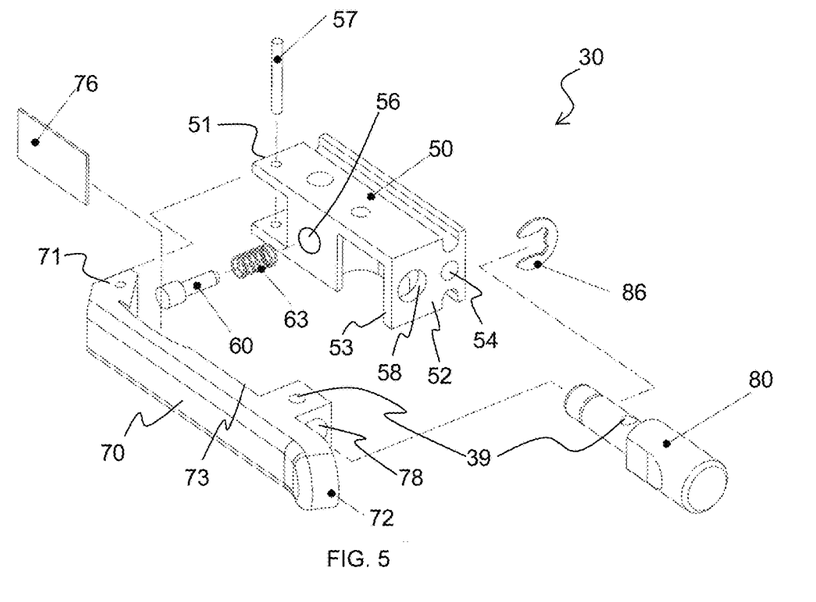
FIG. 5 is an exploded assembly view of the lock assembly of FIG. 1.
Figure 6:
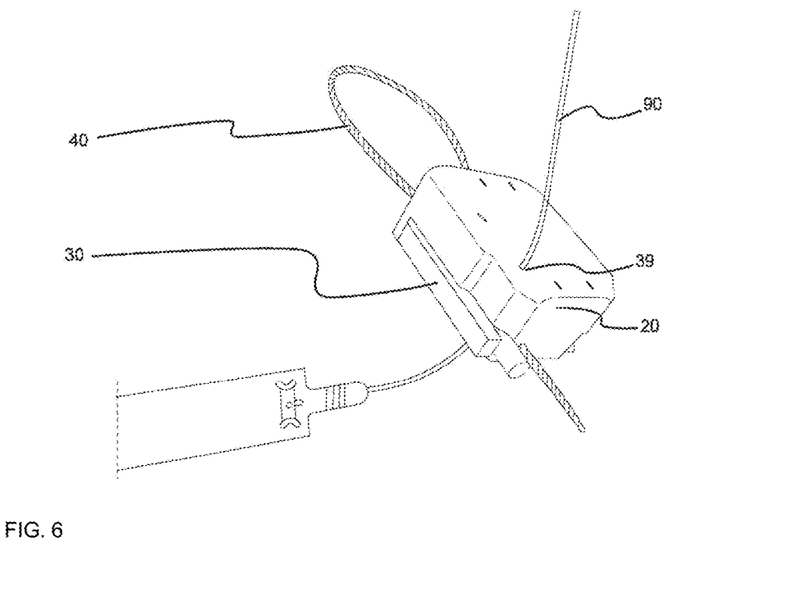
FIG. 6 is a perspective view of a prototype smart security device passed through with a cable tie.

As can be seen in FIGS. 1 and 3, the lock assembly 30 is provided at a side of the housing 20. The lock assembly 30 comprises a body 50 having a first end 51 and second end 52, as shown in FIGS. 4A, 4B and 5. The body 50 is preferably partially encased within the housing 20. A cable passage 54 in the form of a through hole is provided in the body 50. The cable passage 54 extends from the first end 51 to the second end 52 of the body 50. The cable passage 54 is configured to receive the cable 40 therein. Openings provided in the housing 20 are aligned with the cable passage 54 of the body 50 to allow the second end of the 42 of the cable 40 to enter the housing 20 and the cable passage 54 at the first end 51 of the body 50 and to exit the cable passage 54 and the housing 20 at the second end 52 of the body 50.

The lock assembly 30 further comprises a lever 70. A pivoting end 71 of the lever 70 is pivotably connected to the first end 51 of the body 50, for example via a hinge pin 57. A free end 72 of the lever is pivotable away from the body 50 and the housing 20, and is configured to be secured to the second end 52 of the body 50. A side 73 of the lever 70 facing the body 50 (referred to as the inner side 73 of the lever 70) between the pivoting end 71 and the free end 72 is configured to be brought into contact with a side 53 of the body 50 facing the lever 70 (referred to as the outer side 53 of the body 50) in order to immobilize the cable 40 relative to the body 50 when the cable 40 is in the cable passage 54.

A resilient plate 76 is provided at a portion of the inner side 73 of the lever 70. The resilient plate 76 preferably comprises a relatively stiff but still bendable resilient plate. A space 75 may be provided in the inner side 73 of the lever 70 under the resilient plate 76 to allow elastic deformation or bending of the resilient plate 76 into the lever 70. The resilient plate 76 is positioned on the lever 70 to exert a force 99 on a cable immobilizer 60 against the cable 40 to immobilize the cable 40 in the cable passage 54 when the inner side 73 of the lever 70 is brought into contact with the outer side 53 of the body 50.

As shown in FIGS. 4A and 4B, the cable immobilizer 60 is provided in the form of a pin and may be held in a pin passage 56 provided in the body 50. The pin passage 56 may comprise a through hole extending from the outer side 53 of the body 50 into the cable passage 54. The pin passage 56 is configured to receive the cable immobilizer 60 in the form of a pin therein. The cable immobilizer 60 is configured to move along the pin passage 56. The cable immobilizer 60 is longer than the pin passage 56. When a first end 61 of the cable immobilizer 60 is pushed into the pin passage 56 from the outer side 53 of the body 50, a second end 62 of the cable immobilizer 60 will extend out of the pin passage 56 into the cable passage 54 if there is no cable 40 in the pin passage 56. A biasing element 63 may be provided within the pin passage 56 to bias the cable immobilizer 60 away from the cable passage 54. The biasing element 63 preferably comprises a compression spring 63 provide around a shaft of the cable immobilizer 60 in the pin passage 56. The first end 61 of the cable immobilizer 60 may be enlarged in order to provide a rim for engaging a first end the biasing element 63. The pin passage 56 may have a reduced diameter where the pin passage 56 joins the cable passage 54. The reduced diameter of the pin passage 56 acts as a stop for engaging a second end of the biasing element 63. The reduced diameter of the pin passage 56 still allows passage of the second end 62 of the cable immobilizer 60 to pass from the pin passage 56 into the cable passage 54.

When the inner side 73 of the lever 70 is brought into contact with the outer side 53 of the body 50, as shown in FIG. 4B, the resilient plate 76 contacts and exerts a force 99 on the first end 61 of the cable immobilizer 60, against the biasing element 63, thereby tending to extend the second end 62 of the cable immobilizer 60 into the cable passage 54. If the cable 40 is in the cable passage 54 at this time, the second end 62 of the cable immobilizer 60 contacts and presses the cable 40 against the cable passage 54, while the resilient plate 76 exerts a force on the first end 61 of the cable immobilizer 60. Reaction of the first end 61 of the cable immobilizer 60 against the resilient plate 76 displaces the resilient plate 76 into the space 75 because the cable immobilizer 60 is longer than the pin passage 56. In FIG. 4B, the deformation of the resilient plate 76 is shown exaggerated for better understanding of the working principle.

Thus, when the inner side 73 of the lever 70 is brought into contact with the outer side 53 of the body 50, the cable 40 is immobilized against the cable passage 54 as a result of the resilient plate 76 pushing against the cable immobilizer 60 which in turn presses against the cable 40 in the cable passage 54, as shown in FIG. 4B. In this way, the second end 42 of the cable 40 cannot be withdrawn from the housing 20, and the cable 40 and the housing 20 thus form a continuous closed loop.

Notably, an external force indicated by arrow 99 is required to bring the inner side 73 of the lever 70 into contact with the outer side 53 of the body 50 when the cable 40 is in the cable passage 54. Because the cable immobilizer 60 is longer than the pin passage 56, as the lever 70 is brought closer to the body 50, the first end 61 of the cable immobilizer 60 comes into contact with the resilient plate 76 before the inner side 73 of the lever 70 comes into contact with the outer side 53 of the body 50. In order for the inner side 73 of the lever 70 to come into contact with the outer side 53 of the body 50, the resilient plate 76 must elastically deform into the space 75 in order to accommodate the length of the cable immobilizer 60 between the cable 40 and the resilient plate 76. Thus, when the cable 40 is in the cable passage 54, an external force 99 is required to elastically deform the resilient plate 76 against the cable immobilizer 60 in order to immobilize the cable 40 in the cable passage 54.

When the external force 99 is withdrawn without securing the lever 70 to the body 50, the resilient plate 60 ceases to be elastically deformed in the absence of the external force 99 and the inner side 73 of the lever 70 is no longer in contact with the outer side 53 of the body 50 even if the resilient plate 60 continues to rest against the first end 61 of the cable immobilizer 60, as shown in FIG. 4A.

In order to keep the resilient plate 76 pushing against the cable immobilizer 60 to immobilize the cable 40 in the cable passage 54 without having to apply an external force, as shown in FIG. 4B, a fastener 88 is provided to secure the lever 70 to the body 50 after the inner side 73 of the lever 70 has been brought into contact with the outer side 53 of the body 50 to depress the resilient plate 76 against the cable immobilizer 60. To that end, the fastener 88 may comprise a lock passage 58 provided in the body and a lock pin 80 provided on the lever 70. The lock passage 58 is in the form of a hole 58 is provided in the second end 52 of the body 50. The lock passage 58 is preferably laterally displaced from the cable passage 54. The lock pin 80 is provided at the second end 72 of the lever 70 and configured to be inserted into the lock passage 58 to secure the lever 70 to the body 50 when the inner side 73 of the lever 70 has been brought into contact with the outer side 53 of the body 50 to elastically deform the resilient plate 76 against the cable immobilizer 60.

The fastener 88 may further comprise a lock pin retainer 78 provided in the second end 72 of the lever 70 for slidably engaging the lock pin 80 to the lever 70. The lock pin retainer 78 may comprise a through hole provided at the second end 72 of the lever. Preferably, the lock pin 80 is configured to be constantly held within the lock pin retainer 78 so as not to be misplaced. To that end, a securing clip 85 may be provided around the lock pin 80 to prevent withdrawal of the lock pin 80 from the lock pin retainer 78 in the lever 70.

Advantageously, when the lock pin 80 is in the lock passage 58 and the external force is removed, resilience of the resilient plate 60 biases the lever 70 away from the body 50 to slightly displace the inner side 73 of the lever 70 away from the outer side 53 of the body 50. This displacement causes a first side 81 of the lock pin 80 to be pressed against a side of the lock passage 58 while a second side 823 of the lock pin 80 is pressed against a side of the lock pin retainer 78, thereby securing the lock pin 80 between the lever 70 and the body 50.

In order to secure an item with the smart security device 10, the free end 42 of the cable 40 is first passed through a secure portion of the item into the cable passage 54. An external force 99 is then applied to the lever 70 to bring the inner side 73 of the lever into contact with the outer side 53 of the body 50, thereby elastically deforming the resilient plate 76 against the cable immobilizer 60 to press the cable immobilizer 60 against the cable 40 in the cable passage 54. Keeping the external force 99 applied, the lock pin 80 that is passed through the lock pin retainer 78 of the lever 70 is inserted into the lock passage 58 of the body 50. The external force 99 may then be released since the lock pin 80 that is secured between the lever 70 and the body 50 keeps the lever 70 close enough to the body 50 in order for the resilient plate 76 to continue pushing against the cable immobilizer 60 to immobilize the cable 40 in the cable passage 54, The cable 40 and the housing 20 thus form a physical closed continuous loop around the item and the smart security device 10 is in a physically secured state.

To remove the smart security device 10 from the item, the cable 40 must be withdrawn from the cable passage 54 so that the cable 40 and the housing 20 no longer form a closed physical loop. To that end, the lock pin 80 needs to be removed from the lock passage 58 in order to move the lever 70 away from the body 50 to release pressure of the resilient plate 76 against the cable immobilizer 60. Accordingly, an external force 99 must be applied to sufficiently elastically deform the resilient plate 76 against the cable immobilizer 60 in order to the bring the lever 70 towards the body 50 and thereby remove pressure between the sides 81, 82 of lock pin 80 and the lock passage 58 and the lock pin retainer 78, to allow the lock pin 80 to be withdrawn from the lock passage 58.

For added visual confirmation that the smart security device 10 is in a physically secured state, a cable tie hole 39 may be provided through each of the housing 20, the lever 70 and the lock pin 80 when the lock pin 80 is in the lock passage 58 to allow a cable tie 90 to pass through the housing 20, the lever 70 and the lock pin 80 simultaneously. By securing the housing 20, the lever 70 and the lock pin 80 with a single cable tie 90, as shown in FIG. 5, wherein the lock pin 80 cannot be removed withdrawn from the lock passage 58 without cutting the cable tie 90, users are able to quickly visually determine that the smart security device 10 is in a physically secured state.

In addition to the smart security device 10 being configured to physically secure an item by the cable 40 forming a physical closed loop with the housing 20, the smart security device 10 is also configured to establish an electronic lock when activated by an authorized user. To that end, whenever the cable 40 is immobilized in the cable passage 54, the external conductive layer 48 of the cable 40 in the cable passage 54 is configured to be in electrical connection with the electronics in the housing 20. In this way, the electronics, the secured end 41 of the cable 40 via the conducting surround 44, and the external conducting layer 48 of the cable 40 in the cable passage 54 form a closed electrical loop so that the smart security device 10 is electrically ready whenever the cable 40 is immobilized in the cable passage 54.

Electrical contacts (not shown) in electrical connection with the electronics are preferably also provided in the lock passage 58 to close a lock circuit upon contact with the lock pin 80 when the lock pin 80 is in the lock passage 58. Closure of the lock circuit is communicated to the electronics so that physical locking or unlocking of the smart security device 10 with the lock pin 80 can be recorded and kept track of.

The electronics of the smart security device 10 includes a low-cost active RFID beaconing tag 120 provided in the housing 20 and configured to automatically continually and periodically emit a signal and to have a long battery life, for example from five to seven years, without requiring recharge or battery change. In the preferred embodiment, the signal emitted by the tag 120 is in the Industrial, Scientific and Medical (ISM) 2.4 GHz short-range radio frequency band, commonly known as a Bluetooth signal, that is sent and received via a Bluetooth low energy wireless personal area network (BLE). The tag 120 is preferably powered by a small lithium-ion battery. Information transmitted with the emitted signal comprises a unique identification number of the smart security device 10, and may further comprise any other electronically stored information as may be desired, such as date and time of each activation and deactivation of the smart security device 10. The tag 120 typically has a broadcast range for its emitted signals comprising a radius ranging from 10 m to 30 m.

Optionally and preferably, the tag 120 is configured to automatically switch off when in flight mode, so that when affixed to an item that will be transported by an aircraft at some point in time, the tag 120 on the item in the aircraft will not interfere with the navigation or communication system of the aircraft. In the preferred embodiment, the tag 120 is sufficiently low in cost, as to be commercially feasible for only one-time or disposable use.

Figure 7:
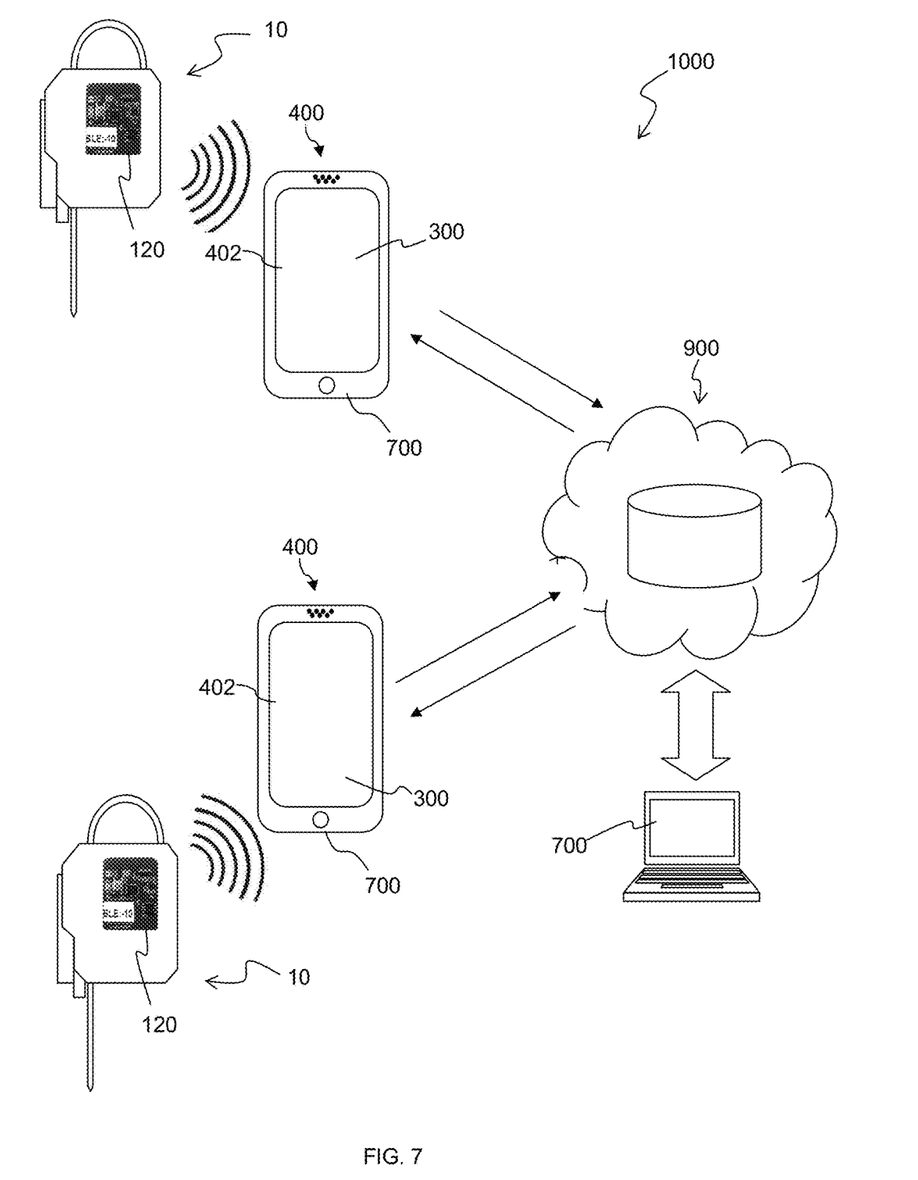
FIG. 7 is a schematic illustration of a smart security system utilizing a number of the smart security devices of FIG. 1 for location and security tracking.

The signals emitted by the tag 120 are configured to be received by receiving transmitters 400 installed with an application 300 configured for location and status tracking of the smart security device 10 in a smart security system 1000, as shown in FIG. 7. Each receiving transmitter 400 may take one of various forms including a smartphone, a tablet, a handheld device, a wearable computing device, a wireless handset, a pager, a personal digital assistant (PDA), a gaming device, a media player, a headset computer, a wireless router or the like. Each receiving transmitter 400 includes a display 402 and a touch-sensitive surface and/or keys for input by a user. Where the receiving transmitter 400 comprises a smart touch-screen mobile phone, it will be understood that the display 402 and touch-sensitive surface are one and the same.

The receiving transmitter 400 may present options for the user to select, controls for the user to actuate, and/or cursors or other indicators for the user to direct. The receiving transmitter 400 may further accept data entry from the user, including numbers to dial or various parameter values for configuring the operation of the handset. The receiving transmitter 400 may further execute one or more software or firmware applications in response to user commands. These applications may configure the receiving transmitter 400 to perform various customized functions in response to user interaction. Additionally, the receiving transmitter 400 may be programmed and/or configured over-the-air, for example from a wireless base station, a wireless access point, or a peer receiving transmitter 400. The receiving transmitter 400 may execute a web browser application which enables the display 402 to show a web page. The web page may be obtained via wireless communications with a base transceiver station, a wireless network access node, a peer receiving transmitter 400 or any other wireless communication network or system.

The application 300 installed in each receiving transmitter 400 is configured for managing information obtained from a signal received from a tag 120. For example, the application 300 may be configured to associate the unique identification number of a smart security device 10 in a signal received from the tag 120 with the receiving transmitter's 400 own present location and identity. In a preferred embodiment, the application 300 is configured to be downloadable from a digital distribution platform (e.g. App Store™ or Google Play™) for installation in each receiving transmitter 400 via Internet connectivity of the receiving transmitter 400.

Figure 8:
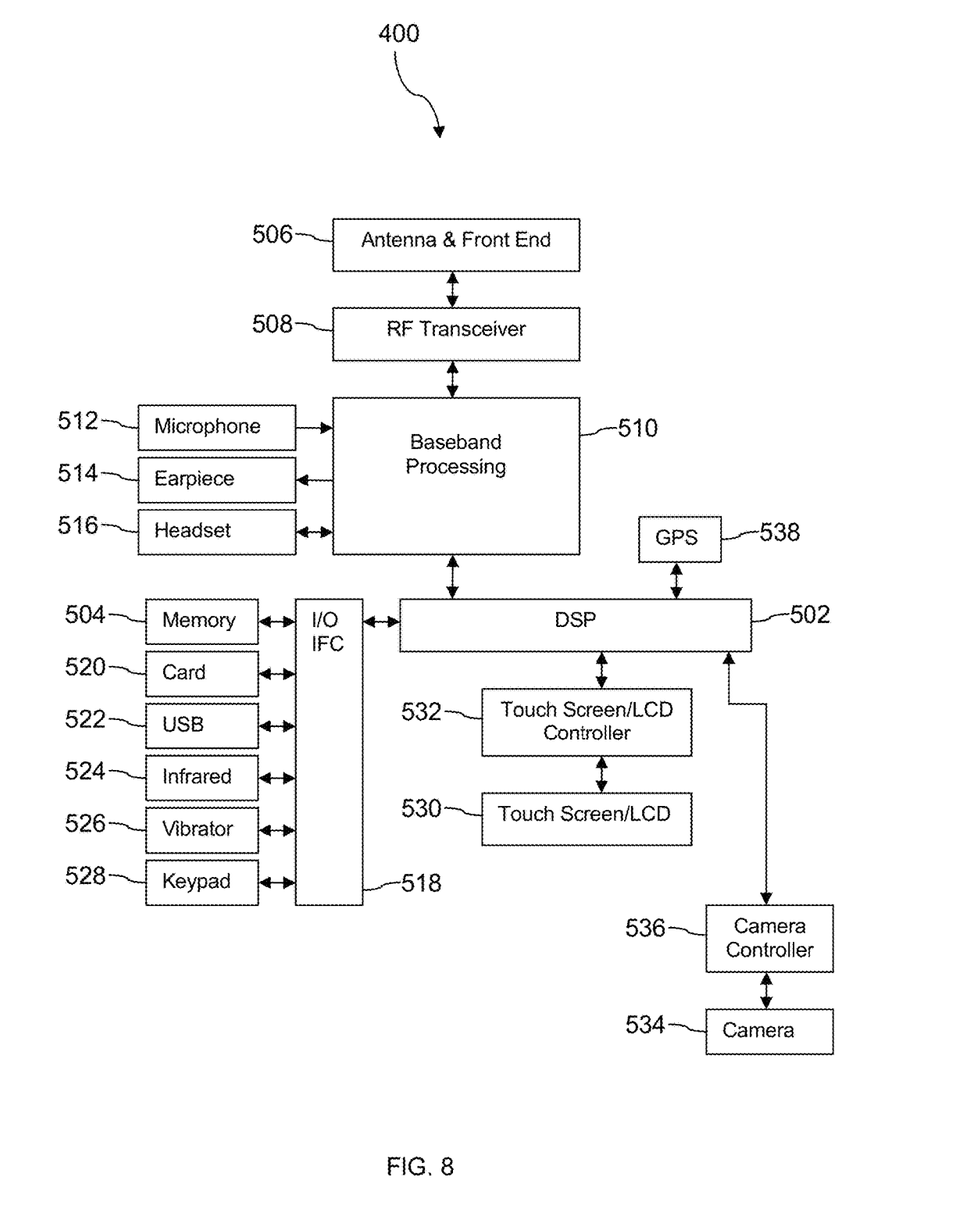
FIG. 8 is a block diagram of a receiving transmitter for installing an application for locating tracking of the smart security device.

FIG. 8 shows a block diagram of the receiving transmitter 400 configured as a mobile phone. In this embodiment, the application 300 would comprise a mobile application 300 configured to be downloadable and installable in the mobile phone receiving transmitter 400. While a variety of known components of handsets are depicted, in an embodiment a subset of the listed components and/or additional components not listed may be included in the receiving transmitter 400. In an embodiment, the receiving transmitter 400 includes a digital signal processor (DSP) 502 and a memory 504, as well as radio frequency (RF) transceiver 508 configured to receive signals from the active tag 120.

As shown, the receiving transmitter 400 may further include an antenna and front end unit 506, a baseband processing unit 510, a microphone 512, an earpiece and/or speaker 514, a headset port 516, an input/output interface 518, a removable memory card 520, a universal serial bus (USB) port 522, an infrared port 524, a vibrator 526, a keypad 528, a touch screen with a touch sensitive surface 530, a touch screen controller 532, a camera 534, a camera controller 536, a global positioning system (GPS) receiver 538, an accelerometer (e.g., a single or multi axis accelerometer), a gyroscope, and the like. In an embodiment, the receiving transmitter 400 may include another kind of display that does not provide a touch sensitive screen. In an embodiment, the DSP 502 may communicate directly with the memory 504 without passing through the input/output interface 518. Additionally, in an embodiment, the receiving transmitter 400 may comprise other peripheral devices that provide other functionality.

The DSP 502 or some other form of controller or central processing unit operates to control the various components of the receiving transmitter 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the receiving transmitter 400 to function as a peripheral device to exchange information with a personal computer or other computer system. The infrared port 524 and other optional ports such as a Bluetooth interface or an IEEE 802.11 compliant wireless interface enable the receiving transmitter 400 to communicate wirelessly with other nearby handsets and/or wireless base stations as well as the active tag 120. In an embodiment, the device 410 may comprise a near field communication (NFC) transceiver. The NFC transceiver may be used to complete payment transactions with point-of-sale terminals or other communications exchanges. In an embodiment, the device 40 may comprise a radio frequency identity (RFID) reader and/or writer device.

The RF transceiver 508 may also be referred to as a radio transceiver, or more concisely, as a radio. While one RF transceiver 508 is illustrated, the receiving transmitter 400 may comprise a plurality of radio transceivers, for example, different RF transceivers 508 associated with different wireless communication protocols and/or different frequency bands. Alternatively, the RF transceiver 508 may be a multi-protocol and/or multi-band RF transceiver.

The keypad 528 couples to the DSP 502 via the input/output interface 518 to provide one mechanism for the user to make selections, enter information, and otherwise provide input to the receiving transmitter 400. Another input mechanism may be the touch screen 530, which may also display text and/or graphics to the user. The touch screen controller 532 couples the DSP 502 to the touch screen 530. The GPS receiver 538 is coupled to the DSP 502 to decode global positioning system signals, thereby enabling the receiving transmitter 400 to determine its position.

Figure 9:
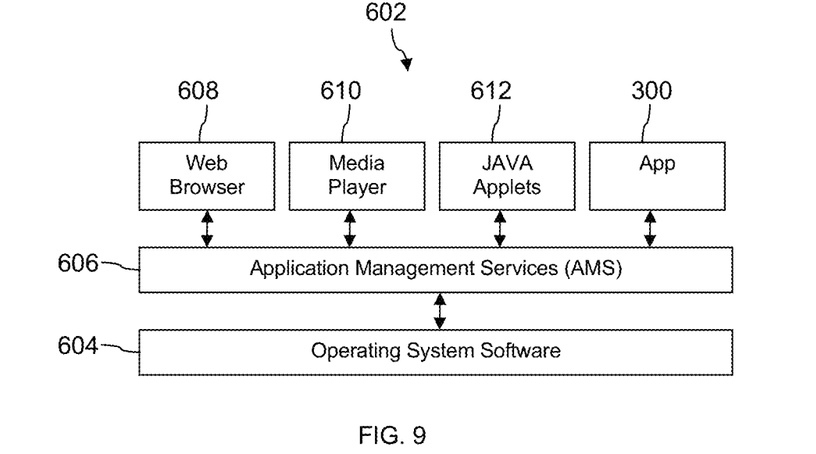
FIG. 9 is an illustration of a software environment that may be implemented by a digital signal processor of the receiving transmitter of FIG. 6.

FIG. 9 illustrates a software environment 602 that may be implemented by the DSP 502. The DSP 502 executes operating system software 604 that provides a platform from which the rest of the software operates. The operating system software 604 may provide a variety of drivers for the handset hardware using interfaces that are accessible to application software. The operating system software 604 may be coupled to and interact with application management services (AMS) 606 that transfer control between applications running on the receiving transmitter 400. Also shown in FIG. 6A are a web browser application 608, a media player application 610, and JAVA applets 612. The web browser application 608 may be executed by the receiving transmitter 400 to browse content and/or the Internet, for example when the receiving transmitter 400 is coupled to a network via a wireless link. The web browser application 608 may permit a user to enter information into forms and select links to retrieve and view web pages. The media player application 610 may be executed by the receiving transmitter 400 to play audio or audiovisual media. The JAVA applets 612 may be executed by the receiving transmitter 400 to provide a variety of functionality including games, utilities, and other functionality.

Figure 10:
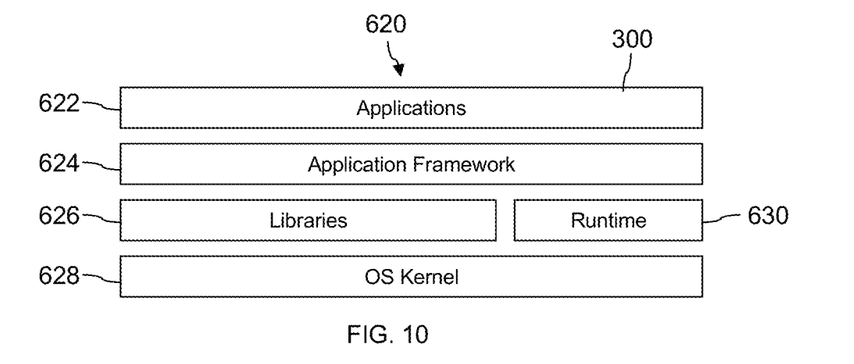
FIG. 10 is an illustration of an alternative software environment that may be implemented by a digital signal processor of the receiving transmitter of FIG. 6.

FIG. 10 illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

As the tag 120 continually emits a signal, the signal preferably includes the status of the smart security device 10. For example, when the cable 40 is immobilized in the cable passage 54 and the lock pin 80 is in the lock passage 58, the signal emitted by the tag 120 in the smart security device 10 preferably indicates that the smart security device 10 is electrically ready and also physically secured. Similarly, when the cable 40 is not in the cable passage 54 and the lock pin 80 is not in the lock passage 58, the signal emitted by the tag 120 should correspondingly indicate so.

Notably, each receiving transmitter 400 is configured to automatically receive signals emitted by any number of tags 120 provided in a corresponding number of smart security devices 10 when the receiving transmitter 400 is within the broadcast range of any of the smart security devices 10. In particular, no pairing between a receiving transmitter 400 and an emitting tag 120 is required in order for the receiving transmitter 400 to receive the signals emitted by the tag 120.

In the smart security system 1000, a data system 900 is provided and configured to be wirelessly or remotely accessible to each of the receiving transmitters 400. The data system 900 is configured to receive, process and store information that is transmitted in a signal generated by and sent from the number of receiving transmitters 400. Accordingly, the data system 900 comprises at least one server for executing tasks and a data store connected to the at least one server for data storage, so as to form a data communicating system with the number of receiving transmitters 400. For example, the data system 900 may comprise a cloud-based computing system, a web-based portal, a back-end server and the like. In the preferred embodiment, each of the number of receiving transmitters 400 is configured to transmit information to the data system 900 via Internet connectivity.

Information in the signal transmitted from the receiving transmitter 400 to the data system 900 comprises at least part of the information contained in the signal emitted by a tag 120 of smart security device 10 that has been received by the receiving transmitter 400 when the receiving transmitter 400 is within the broadcast range of the tag 120. Information in the signal transmitted from the receiving transmitter 400 to the data system 900 also further comprises information associated with the receiving transmitter 400 itself. In one embodiment where the receiving transmitters 400 comprise mobile phones, such information may comprise user identity and location information of each mobile phone receiving transmitter 400 obtained via a global positioning system (GPS) functionality of each mobile phone receiving transmitter 400.

In other embodiments where the receiving transmitter 400 is a stationary device, location of the receiving transmitter 400 would have been previously stored with the data system 900 so that this location can be associated with a tag 120 which signal has been received by the receiving transmitter 400.

Thus, when a specific receiving transmitter 400 that is within broadcast range of a particular tag 120 has received a first signal emitted by the particular tag 120, information in the first signal well as location information of the specific receiving transmitter 400 can be transmitted by the receiving transmitter 400 in a second signal to the data system 900, thereby allowing the particular tag 120 to be associated with the location of the specific receiving transmitter 400.

In one embodiment, the application 300 is configured to allow a user of the receiving transmitter 400 to activate transmission of the second signal from the receiving transmitter 400 to the data system 900 via a graphical user interface. In a preferred embodiment, the graphical user interface may be configured as a web portal. Alternatively or in addition, the application may be configured to automatically initiate transmission of the second signal to the data system 900 when the receiving transmitter 400 comes within the broadcast range of a tag 120 and receives the first signal from the tag 120. Where the application 300 is configured to allow both automatic as well as user-activated transmission of the second signal from the receiving transmitter 400 to the data system 900, the application 300 is preferably configured to allow a user to selectably set the application 300 to perform either automatic or user-activated transmission of the second signal from the receiving transmitter 400 to the data system 900.

As one receiving transmitter 400 may be within the broadcast range of a plurality of tags 120 in a corresponding plurality of smart security devices 10 and therefore receives a plurality of signals emitted by the plurality of tags 120, the application 300 may further be configured to allow a user to select which of the plurality of signals the user wishes the receiving transmitter 400 to obtain information from for onward transmission to the data system 40 in the second signal.

In another embodiment, where the application 300 is configured to automatically initiate transmission of the second signal from each of the number of receiving transmitters 400 to the data system 900, the second signal sent to the data system 900 would expectedly contain information obtained from the signals received from all the tags 120 that each receiving transmitter 400 is within the broadcast range of. Under such circumstances, where a particular tag 120 has, for example, two receiving transmitters 400 within its broadcast range, information from the particular tag 120 is sent to the data system 20 by both the two receiving transmitters 400. In order for the data system 900 to determine which receiving transmitter 400 is nearer the particular tag 120, a received signal strength indication (RSSI) may be determined by each receiving transmitter 400 for each signal emitted by a tag 120 that is received by each receiving transmitter 400. The RSSI may thus be also included in the second signal sent to the data system 900. In this way, the RSSI for a particular tag 120 which information was included in the second signals sent by two receiving transmitters 400 may be compared, so that the location of the receiving transmitter 400 that transmitted a higher RSSI may be selected as a closest estimate of the actual location of the particular tag 120.

Importantly, the unique identity of each smart security device 10 must have been previously associated with a specific item to which each smart security device 10 is affixed, thereby creating an association database of unique device-and-item pairs. This association database is preferably stored and accessible in the data system 900, such that tracking a location of a particular tag 120 in a smart security device 10 is as good as and equivalent to tracking a location of the specific item affixed with that particular smart security device 10.

In addition, the data system 900 is preferably configured to allow one or more users using a client machine 60 in data communication with the data system 900 to query a status of an item that has been secured with a smart security device 10, in order to determine a last known location of the item, the last known location being indicated by a last one of the number of receiving transmitters 400 to have come within the broadcast range of the tag 120 in the smart security device 10. Besides storing and providing the last known location of an item secured with a smart security device 10, the data system 900 is preferably also configured to store and to allow a user to view on the client machine 700 a movement history of the item as previously registered by other receiving transmitters 400 sequentially prior to and leading up to the last known location of the item. Notably, any one of the receiving transmitters 400 may be further configured to function as a client machine 700 in data communication with the data system 900.

In addition to the application 300 being configured for managing information obtained from a signal received from a tag 120, the application 300 is preferably also configured to allow authorized users to operate the smart security device 10. Accordingly, data in the signals emitted by the tag 120 is preferably encrypted so that only authorized users are able to communicate with and operate the smart security device 10.

In one example of operation, when the smart security device 10 is electrically ready (the cable 40 is immobilized in the cable passage 54), the application 300 can be configured to allow an authorized user to turn on an electronic lock of the smart security device 10 via the electronics in the device 10. When the electronic lock is on, preferably, the signal emitted by the tag 120 should indicate so. The electronic lock is preferably configured to be unlockable only by an authorized user having a receiving transmitter 400 installed with the application 300 that has been set up to be able to unlock the electronic lock. In this way, the smart security device 10 provides an additional layer of security of the item via the electronic lock.

In addition to location of the smart security device 10, the application 300 may be configured to identify a user of the application 300 such that when an item has been secured with the smart security device 10, using the transmitters 400 and data system 900 described above, authorized parties are able to determine the item's status (e.g. physical lock on or off, electronic lock on or off), location, as well as the identity of the party presently holding the item in custody. This allows handing over of the item from one registered party to another to be recorded in the data system 900 when the various parties acknowledge handing over and proof of delivery of the item accordingly. Furthermore, as the smart security device 10 may also be configured to emit a corresponding signal when it has been unlocked, whether physically or electronically, information such as date, time and identity of the unlocking location (and accordingly the party with which the item is in present custody) may also be similarly recorded.

Using the smart security system 1000, an entire chain of custody of an item secured with the smart security device 10 can be tracked and recorded from origin to final destination through various handling parties along the way, in which not only location but also other events such as locking or unlocking of the item during transit can be recorded with time. The system 1000 further allows for electronic proof of delivery to be made by an authorized recipient of an item secured with the smart security device 10, using the application 300 in the recipient's receiving transmitter 400 to send an electronic proof of receipt to the data system 900. Such electronic proof may in turn be automatically transmitted to the sender of the item to confirm delivery.

Besides tracking chain of custody of items, the smart security device 10 and system 1000 may also be used for area surveillance to determine presence of an item at a location. For example, the storage location may be provided with a stationary transmitter 400 as described above to receive the periodic emitted signals from each of the smart security devices 10 attached to secured items in that location. Each of the smart security devices 10 are registered with the data system 900 for indicating that the secured items are expected to be at the storage location. The application 300 in the stationary transmitter 400 may be configured to match received signals from the smart security devices 10 in the location with expected presence of the registered smart security devices 10, and to transmit an alert to the data system 900 if any signal that is expected to be received from a registered smart security device 10 (that is expected to be in that location) is not received by the stationary transmitter 400 within a specified time frame. In this way, users may be informed of theft or any other unauthorized removal of an item secured with a registered smart security device 10 from the location within the specified time frame when so alerted by the stationary transmitter 400.

With the smart security device 10 and system 1000 as described above, users can be protected from losses such as loss of revenue arising from missing, stolen or misplaced cargo, or loss of a vehicle or valuable item, as the deterrent effect of having the smart security device 10 is expected to reduce instances of missing or stolen cargo, or theft. Cost of administration and transportation can be reduced by replacing costly human security escorts with the cost-effective smart security device 10 that allows location and status of a secured item to be continually tracked along its entire chain of custody, including during storage. Cargo movement can be sped up with the minimizing of manual security interventions by use of the smart security device 10, thereby also raising user confidence levels in the integrity of the various conveyances involved.

Whilst there has been described in the foregoing description exemplary embodiments of the present invention, it will be understood by those skilled in the technology concerned that many variations in details of design, construction and/or operation may be made without departing from the present invention. For example, while the fastener of the lock assembly has been described as comprising a lock passage in the body of the lock assembly and a lock pin provided on the lever of the lock assembly, other suitable configurations of the fastener 88 may be devised to secure the lever to the body when the cable has been immobilized in the cable passage. While the cable immobilizer has been described and depicted as a pin held in a pin passage in the body of the lock assembly, the cable immobilizer may have other configurations. For example, the cable immobilizer may alternatively be attached to the resilient plate provided on the lever, and configured to contact the cable when the lever is brought into contact with the body, e.g., as a boss protruding from the resilient plate. Additional means to secure the lock pin when the lock pin is in the lock passage to prevent withdrawal of the lock pin from the lock passage may be provided. Such means serve to provide an additional physical lock to keep the smart security device in the physically secured state around the item. Such means may be motorized.

The invention claimed is:

1. A smart security device for attaching to an item to be secured, the smart security device comprising:
   a housing,
   electronics provided in the housing, the electronics comprising a tag configured to be uniquely associated with the smart security device, the tag further configured to automatically and periodically emit a first signal, the first signal being a Bluetooth signal configured to be sent and received via a Bluetooth low energy wireless personal area network;
   a cable having a free end and a secured end, the secured end being secured to the housing and in electrical connection with the electronics; and
   a lock assembly at least partially provided in the housing, the lock assembly comprising
   a body comprising a cable passage configured for passing the free end of the cable therethrough and for immobilizing the cable therein,
   a lever having a free end and a pivoting end, the pivoting end pivotably connected to the body, the lever having a resilient plate provided thereon, the resilient plate configured to exert a force on a cable immobilizer against the cable to immobilize the cable in the cable passage when a side of the lever facing the body is brought into contact with a side of the body facing the lever while the cable is in the cable passage, and
   a fastener configured to secure the lever to the body when the cable is immobilized in the cable passage.

2. The smart security device of claim 1, wherein the cable immobilizer comprises a pin and the body further comprises a pin passage configured for holding the cable immobilizer therein, the pin passage opening into the cable passage, wherein upon exerting a force on a first end of the cable immobilizer, a second end of the cable immobilizer extends out of the pin passage into the cable passage when the cable is not in the cable passage.

3. The smart security device of claim 1, wherein the resilient plate is configured to be elastically deformed against the cable immobilizer when the cable is in the cable passage and the lever is secured to the body, the cable immobilizer being longer than the pin passage.

4. The smart security device of claim 1, further comprising a biasing element provided within the pin passage to bias the cable immobilizer away from the cable passage.

5. The smart security device of claim 1, wherein the fastener comprises a lock passage provided in the body and a lock pin provided on the lever, the lock passage configured to receive the lock pin therein.

6. The smart security device of claim 5, wherein the lever and the lock pin are provided with a hole passing through the lever and the lock pin, the hole configured for passing a cable tie therethrough to secure the lock pin to the lever and prevent withdrawal of the lock pin from the lock passage without cutting of the cable tie.

7. The smart security device of claim 1, wherein the body is at a side of the housing and partially encased by the housing.

8. A smart security system comprising:
   the smart security device of claim 1;
   a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal;
   a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network; and
   an application configured to be installed in the receiving transmitter, the application configured to allow the receiving transmitter to automatically receive the first signal and to initiate transmission of the second signal from the receiving transmitter to the data system.

9. The smart security system of claim 8, wherein the first signal comprises information associated with the smart security device, and wherein the second signal comprises information associated with the receiving transmitter and at least part of the information associated with the smart security device.

10. The smart security system of claim 9, wherein the information associated with the receiving transmitter includes ownership and location information of the receiving transmitter, and wherein the information associated with the smart security device includes information identifying the item to which the smart security device is attached and status of the smart security device.

11. The smart security system of claim 10, wherein status of the smart security device comprises at least one of: whether the smart security device is electronically locked and whether the smart security device is physically secured.

12. The smart security system of claim 8, comprising a plurality of the receiving transmitter at various locations, and wherein the second signal transmitted from each of the plurality of the receiving transmitter provides a record of movement of the item to which the smart security device is attached and a record of status of the smart security device, the movement being from an authorized sender to an authorized recipient through the various locations.

13. The smart security system of claim 12, wherein the second signal from one of the plurality of the receiving transmitter that is located at a location of the authorized recipient includes an electronic proof of delivery when the authorized recipient receives the item.

14. The smart security system of claim 8, wherein the application is configured to initiate transmission of the second signal from the receiving transmitter to the data system via at least one of: automatic transmission and user-activated transmission.

15. The smart security system of claim 14, wherein the application is configured to allow a user to select one of: automatic transmission and user-activated transmission to initiate transmission of the second signal from the receiving transmitter to the data system.

16. The smart security system of claim 8, comprising a plurality of the smart security device, the receiving transmitter being provided at a location where a number of items are stored, each of the number of items having one of the plurality of the smart security device attached thereto that is registered with the data system to indicate that the number of items are expected to be at the location, wherein the application installed in the receiving transmitter is configured to match received signals from each of the smart security devices at the location with expected presence of the registered smart security devices and to transmit an alert to the data system if a signal expected to be received from any one of the registered smart security devices is not received by the receiving transmitter within a specified time frame.

\* \* \* \* \*